United States Patent
Xu et al.

(10) Patent No.: US 9,538,197 B2
(45) Date of Patent: Jan. 3, 2017

(54) METHODS AND SYSTEMS TO ESTIMATE MOTION BASED ON RECONSTRUCTED REFERENCE FRAMES AT A VIDEO DECODER

(71) Applicant: Intel Corporation, Santa Clara, CA (US)

(72) Inventors: Lidong Xu, Beijing (CN); Yi-Jen Chiu, San Jose, CA (US); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/578,802

(22) Filed: Dec. 22, 2014

(65) Prior Publication Data

US 2015/0304682 A1    Oct. 22, 2015

Related U.S. Application Data (63) Continuation of application No. 12/566,823, filed on Sep. 25, 2009, now Pat. No. 8,917,769.

(Continued)

(51) Int. Cl.
*H04N 7/12* (2006.01)
*H04N 19/577* (2014.01)
(Continued)

(52) U.S. Cl.
CPC .......... *H04N 19/577* (2014.11); *H04N 19/103* (2014.11); *H04N 19/137* (2014.11);
(Continued)

(58) Field of Classification Search
None
See application file for complete search history.

(56) References Cited

U.S. PATENT DOCUMENTS 6,014,473 A    1/2000    Hossack et al.
6,058,142 A    5/2000    Ishikawa et al.
(Continued)

FOREIGN PATENT DOCUMENTS

CN    1450809 A    10/2003
CN    1961582 A    5/2007
(Continued)

OTHER PUBLICATIONS

Notice of Allowance Received for U.S. Appl. No. 13/895,939 mailed on Sep. 12, 2014.

(Continued)

*Primary Examiner* — Michael J Moore, Jr.
(74) *Attorney, Agent, or Firm* — Green, Howard & Mughal LLP (57) ABSTRACT

Methods and systems to apply motion estimation (ME) based on reconstructed reference pictures in a B frame or in a P frame at a video decoder. For a P frame, projective ME may be performed to obtain a motion vector (MV) for a current input block. In a B frame, both projective ME and mirror ME may be performed to obtain an MV for the current input block. The ME process can be performed on sub-partitions of the input block, which may reduce the prediction error without increasing the amount of MV information in the bitstream. Decoder-side ME can be applied for the prediction of existing inter frame coding modes, and traditional ME or the decoder-side ME can be adaptively selected to predict a coding mode based on a rate distribution optimization (RDO) criterion.

20 Claims, 8 Drawing Sheets

Related U.S. Application Data (60) Provisional application No. 61/222,982, filed on Jul. 3, 2009.

(51) Int. Cl.
| | | |
|---|---|---|
| *H04N 19/61* | (2014.01) | |
| *H04N 19/44* | (2014.01) | |
| *H04N 19/57* | (2014.01) | |
| *H04N 19/573* | (2014.01) | |
| *H04N 19/137* | (2014.01) | |
| *H04N 19/139* | (2014.01) | |
| *H04N 19/513* | (2014.01) | |
| *H04N 19/52* | (2014.01) | |
| *H04N 19/103* | (2014.01) | |
| *H04N 19/172* | (2014.01) | |

(52) U.S. Cl.
CPC ......... *H04N 19/139* (2014.11); *H04N 19/172* (2014.11); *H04N 19/44* (2014.11); *H04N 19/513* (2014.11); *H04N 19/52* (2014.11); *H04N 19/57* (2014.11); *H04N 19/573* (2014.11); *H04N 19/61* (2014.11)

(56) References Cited

U.S. PATENT DOCUMENTS

| | | |
|---|---|---|
| 6,289,052 B1 | 9/2001 | Faryar et al. |
| 6,519,005 B2 | 2/2003 | Bakhmutsky et al. |
| 6,707,367 B2 | 3/2004 | Castaneda et al. |
| 7,010,279 B2 | 3/2006 | Rofougaran |
| 7,023,921 B2 | 4/2006 | Subramaniyan et al. |
| 7,133,451 B2 | 11/2006 | Kim et al. |
| 7,248,844 B2 | 7/2007 | Rofougaran |
| 7,259,649 B2 | 8/2007 | Ancey et al. |
| 7,260,148 B2 | 8/2007 | Sohm |
| 7,289,672 B2 | 10/2007 | Sun et al. |
| 7,336,720 B2 | 2/2008 | Martemyanov et al. |
| 7,463,687 B2 | 12/2008 | Subramaniyan et al. |
| 7,526,256 B2 | 4/2009 | Bhatti et al. |
| 7,590,180 B2 | 9/2009 | Kang |
| 7,616,692 B2 | 11/2009 | Holcomb et al. |
| 7,683,851 B2 | 3/2010 | Rofougaran et al. |
| 7,751,482 B1 | 7/2010 | Srinivasan et al. |
| 7,764,740 B2 | 7/2010 | Seok et al. |
| 7,880,547 B2 | 2/2011 | Lee et al. |
| 7,890,066 B2 | 2/2011 | Rofougaran |
| 7,924,135 B2 | 4/2011 | Chen et al. |
| 7,940,152 B1 | 5/2011 | Kim et al. |
| 8,107,748 B2 | 1/2012 | Miao et al. |
| 8,233,538 B2 | 7/2012 | Sun et al. |
| 8,238,421 B2 | 8/2012 | Choi et al. |
| 8,279,018 B1 | 10/2012 | Song et al. |
| 8,279,927 B2 | 10/2012 | Sun et al. |
| 8,295,551 B2 | 10/2012 | Lertrattanapanich et al. |
| 8,331,450 B2 | 12/2012 | Sun et al. |
| 8,462,852 B2 | 6/2013 | Xu et al. |
| 8,494,054 B2 | 7/2013 | Nair et al. |
| 8,519,814 B2 | 8/2013 | Feng et al. |
| 8,917,769 B2 | 12/2014 | Xu et al. |
| 2002/0175320 A1 | 11/2002 | Heun et al. |
| 2002/0176500 A1 | 11/2002 | Bakhmutsky et al. |
| 2003/0031128 A1 | 2/2003 | Kim et al. |
| 2003/0063671 A1 | 4/2003 | Song |
| 2003/0063673 A1 | 4/2003 | Riemens et al. |
| 2003/0095603 A1 | 5/2003 | Lan et al. |
| 2003/0189981 A1 | 10/2003 | Lee |
| 2004/0046891 A1 | 3/2004 | Mishima et al. |
| 2004/0114688 A1 | 6/2004 | Kang |
| 2004/0223548 A1 | 11/2004 | Kato et al. |
| 2005/0018772 A1 | 1/2005 | Sung et al. |
| 2005/0135481 A1 | 6/2005 | Sung et al. |
| 2005/0220190 A1 | 10/2005 | Ha et al. |
| 2005/0259736 A1 | 11/2005 | Payson |
| 2005/0286777 A1 | 12/2005 | Kumar et al. |
| 2006/0018383 A1 | 1/2006 | Shi et al. |
| 2006/0109905 A1 | 5/2006 | Seok et al. |
| 2006/0215761 A1 | 9/2006 | Shi et al. |
| 2007/0053440 A1 | 3/2007 | Hsieh et al. |
| 2007/0064803 A1 | 3/2007 | Miao et al. |
| 2007/0064804 A1 | 3/2007 | Paniconi et al. |
| 2007/0086526 A1 | 4/2007 | Koto et al. |
| 2007/0116124 A1 | 5/2007 | Wu et al. |
| 2007/0223585 A1 | 9/2007 | Fujisawa et al. |
| 2007/0239546 A1 | 10/2007 | Blum et al. |
| 2007/0268964 A1 | 11/2007 | Zhao |
| 2007/0297510 A1 | 12/2007 | Herpel et al. |
| 2008/0069230 A1 | 3/2008 | Kondo et al. |
| 2008/0101707 A1 | 5/2008 | Mukherjee et al. |
| 2008/0159398 A1 | 7/2008 | Murakami et al. |
| 2008/0159400 A1 | 7/2008 | Lee et al. |
| 2008/0175320 A1 | 7/2008 | Sun et al. |
| 2008/0181309 A1 | 7/2008 | Lee et al. |
| 2008/0214146 A1 | 9/2008 | Lincoln et al. |
| 2008/0240242 A1 | 10/2008 | Lainema |
| 2008/0253149 A1 | 10/2008 | Matumoto |
| 2008/0253457 A1 | 10/2008 | Moore |
| 2008/0281685 A1 | 11/2008 | Jaffe et al. |
| 2009/0060359 A1 | 3/2009 | Kim et al. |
| 2009/0067505 A1 | 3/2009 | Tourapis et al. |
| 2009/0161763 A1 | 6/2009 | Rossignol et al. |
| 2009/0172751 A1 | 7/2009 | Aldrey et al. |
| 2009/0207915 A1 | 8/2009 | Yan et al. |
| 2009/0238268 A1 | 9/2009 | Hsu et al. |
| 2009/0304084 A1 | 12/2009 | Hallapuro et al. |
| 2010/0046614 A1 | 2/2010 | Choi et al. |
| 2010/0109798 A1 | 5/2010 | Chu |
| 2010/0166072 A1 | 7/2010 | Bukin |
| 2010/0201457 A1 | 8/2010 | Lee et al. |
| 2010/0296580 A1 | 11/2010 | Metoevi et al. |
| 2011/0002387 A1 | 1/2011 | Chiu et al. |
| 2011/0002389 A1 | 1/2011 | Xu et al. |
| 2011/0002390 A1 | 1/2011 | Chiu et al. |
| 2011/0043316 A1 | 2/2011 | Yang et al. |
| 2011/0090964 A1 | 4/2011 | Xu et al. |
| 2011/0261882 A1 | 10/2011 | Zheng et al. |
| 2011/0286523 A1 | 11/2011 | Dencher |
| 2012/0294370 A1 | 11/2012 | Chiu et al. |
| 2013/0064296 A1 | 3/2013 | Sun et al. |
| 2013/0082810 A1 | 4/2013 | Feng et al. |
| 2013/0287111 A1 | 10/2013 | Xu et al. |
| 2013/0336402 A1 | 12/2013 | Xu et al. |

FOREIGN PATENT DOCUMENTS

| | | |
|---|---|---|
| CN | 1977539 A | 6/2007 |
| CN | 101001377 A | 7/2007 |
| CN | 101005620 | 7/2007 |
| CN | 101018334 | 8/2007 |
| CN | 101023673 A | 8/2007 |
| CN | 101023676 A | 8/2007 |
| CN | 101378504 A | 3/2009 |
| CN | 101621696 A | 6/2009 |
| CN | 101647285 A | 2/2010 |
| CN | 101945276 A | 1/2011 |
| CN | 102045563 A | 5/2011 |
| CN | 102340664 A | 2/2012 |
| DE | 102010025816 A1 | 1/2011 |
| DE | 102010046508 A1 | 6/2011 |
| DE | 102011008630 A1 | 9/2011 |
| EP | 1903798 A2 | 3/2008 |
| EP | 1932366 A2 | 6/2008 |
| EP | 1936995 | 6/2008 |
| EP | 1936998 | 6/2008 |
| EP | 1981281 A2 | 10/2008 |
| GB | 2248361 | 4/1992 |
| GB | 2471577 A | 1/2011 |
| GB | 2477033 B | 4/2012 |
| JP | 10023420 A | 1/1998 |
| JP | 10336666 A | 12/1998 |
| JP | 11205799 A | 7/1999 |
| JP | 2000350211 A | 12/2000 |
| JP | 2003169338 A | 6/2003 |
| JP | 2003319400 A | 11/2003 |

(56) References Cited

FOREIGN PATENT DOCUMENTS

| | | |
|---|---|---|
| JP | 2004048512 A | 2/2004 |
| JP | 2005094458 A | 2/2004 |
| JP | 2004328633 A | 11/2004 |
| JP | 2004343349 A | 12/2004 |
| JP | 2005269164 A | 9/2005 |
| JP | 2006033433 A | 2/2006 |
| JP | 2009044350 A | 2/2009 |
| JP | 2011029863 A | 2/2011 |
| KR | 20090069461 A | 7/2009 |
| KR | 1020110003438 A | 1/2011 |
| TW | 494686 | 7/2007 |
| TW | I298597 | 7/2008 |
| TW | I301953 | 10/2008 |
| TW | I303944 | 12/2008 |
| TW | 201127068 A | 8/2011 |
| TW | 201204054 A | 1/2012 |
| TW | 200708115 | 6/2012 |
| WO | 2006000504 A1 | 1/2006 |
| WO | 2007035276 A2 | 3/2007 |
| WO | 2008117158 | 10/2008 |
| WO | 2009110754 A2 | 9/2009 |
| WO | 2009110754 A3 | 10/2009 |
| WO | 2010056041 A1 | 8/2010 |
| WO | 2010086041 | 8/2010 |
| WO | 2012125178 A1 | 6/2011 |
| WO | 2012045225 A1 | 4/2012 |
| WO | 2012083487 A1 | 6/2012 |
| WO | 2013048908 A1 | 4/2013 |

OTHER PUBLICATIONS

Office Action for Taiwanese Patent Application No. 100136070, mailed on Jul. 24, 2014.
European Search report for EP Patent Application No. 11860936.1, mailed on Aug. 29, 2014.
Notice of Allowance for Chinese Patent Application No. 201110056040.4, mailed on Aug. 6, 2014.
Office Action for Taiwanese Patent Application No. 100101277 mailed on Feb. 14, 2014.
Office Action for Korean Patent Application No. 1020110004254, mailed on Dec. 17, 2013.
Office Action for Korean Patent Application No. 1020137002525, mailed on Jan. 24, 2014.
Notice of Allowance received for United Kingdom Patent Application No. 1100658.2, mailed on Mar. 20, 2012.
Notice of Grant for Chinese Patent Application No. 201010507057. 2, mailed on Mar. 6, 2014.
Office Action for Chinese Patent Application No. 201010507057.2, mailed on Oct. 28, 2013.
Notice of Allowance for Japanese Patent Application No. 2011004871, mailed on Mar. 12, 2013.
Office Action for Chinese Patent Application No. 201110056040.4, mailed on Mar. 31, 2014.
Notice of Allowance for Japanese Patent Application No. 2013532027 mailed on Jun. 10, 2014.
Office Action received for Japanese Patent Application No. 2013532027,. mailed on Jan. 21, 2014.
Office Action for Japanese Patent Application No. 201340202, mailed on Feb. 4, 2014.
Kamp et al., "Decoder Side Motion Vector Derivation for Inter Frame Video Coding", Oct. 15, 2008.
Office Action received for Japanese Patent Application No. 2013540202, mailed on May 20, 2014.
International Preliminary Report on Patentability for International Application No. PCT/CN2010/002107, mailed on Jul. 4, 2013.
International Preliminary Report on Patentability for International Application No. PCT/US2011/042292, mailed on Sep. 26, 2013.
International Preliminary Report on Patentability for International Application No. PCT/US2012/056682, mailed on Apr. 10, 2014.

Office Action for Chinese Patent Application No. 201110056040.4, mailed on Sep. 2, 2013.
Office Action for Japanese Patent Application No. 100101277, mailed on Aug. 7, 2013.
International Search Report and Written Opinion for International Patent Application No. PCT/US2011/042292, mailed on Mar. 23, 2012.
Office Action for Chinese Patent Application No. 201010270056.0, mailed on May 27, 2013.
Office Action for Korean Patent Application No. 1020114254, mailed on Jun. 19, 2013.
Office Action received for Chinese Patent Application 201010507057.2, mailed on Apr. 12, 2013.
Notice of Allowance for Korean Application No. 1020100064539, mailed on Sep. 27, 2012.
Notice of Allowance for Korean Patent Application No. 1020100102216, mailed on Nov. 26, 2012.
Office Action for Chinese Patent Application 201010270056.0, mailed on Dec. 13, 2012.
Notice of Allowance for Japanese Patent Application No. 2010211120, mailed on Jan. 24, 2012.
International Preliminary Report on Patentability for International Patent Application No. PCT/CN2011/000568, mailed on Apr. 9, 2013.
International Search Report and Written Opinion for International Patent Application No. PCT/US2012/056682, mailed on Mar. 4, 2013.
Guo et al, "Distributed Video Coding with Spatial Correlation Exploited Only at the Decoder", IEEE School of Computer Science and Technology, Harbin Institute of Technology, Harbin, 150001, China, Microsoft Research Asia, Beijing, 100080, China, 2007, pp. 41-44.
Office Action for Korean Patent Application No. 20100102216, mailed on May 22, 2012.
Office Action for Chinese Patent Application No. 201010507057.2, mailed on Aug. 3, 2012.
Office Action for Korean Patent Application No. 1020104254, mailed on Jun. 12, 2012.
Office Action for Japanese Patent Application No. 2011004871, mailed on Aug. 14, 2012.
International Search Report and Written Opinion for International Patent Application No. PCT/CN2010/002107, mailed on Oct. 13, 2011.
Office Action for German Patent Application No. 102010046508.9, mailed on Sep. 5, 2012.
Office Action for Japanese Patent Application No. 2011004871, mailed on Nov. 20, 2012.
Murakami, et al., "Advanced B Skip Mode with Decoder-side Motion Estimation", 37th VCEG Meeting @ Yokohama, VCEG-AK12, Hitachi Inspire the Next, Central Research Laboratory, Embedded System Platform Research Laboratory, Apr. 15-18, 2009, 8 pages.
Office Action for Korean Patent Application No. 1020110004254, mailed Dec. 26, 2012.
Office Action for Chinese Patent Application No. 201010270056.0, mailed May 3, 2012.
International Search Report and Written Opinion for International Patent Application No. PCT/CN2011/000568, mailed on Jan. 19, 2012.
Office Action for Korean Patent Application No. 20100064539, mailed on Feb. 10, 2012.
Chen et al., "A Macroblock Level Adaptive Search Range Algorithm for Variable Block Size Motion Estimation in H.264/AVC", International Symposium on Intelligent Signal Processing and Communication Systems, ISPACS, Xiamen, China, Nov. 28-Dec. 1, 2007, pp. 598-601.
Hsia et al., "High Efficiency and Low Complexity Motion Estimation Algorithm for MPEG-4 AVC/H.264 Coding", Tamkang Journal of Science and Engineering, 2007, vol. 10, No. 3, pp. 221-234.
Nisar et al., "Fast Motion Estimation Algorithm Based on Spatio-Temporal Correlation and Direction of motion Vectors", Electronics Letters, Dept. of Mechatronics, Gwangju Inst. of Sci. & Technol., Nov. 23, 2006, vol. 42, No. 24, pp. 2.

(56) References Cited

OTHER PUBLICATIONS

Werda et al., "Optimal DSP-Based Motion Estimation Tools Implementation for H.264/AVC Baseline Encoder", IJCSNS International Journal of Computer Science and Network Security, May 2007, vol. 7, No. 5, pp. 141-150.
Office Action for German Patent Application No. 102010046508.9, mailed on Jul. 26, 2011.
Combined Search and Examination Report for UK Patent Application No. 1100658.2, mailed on May 16, 2011.
Kamp et al., "Decoder Side Motion Vector Derivation for Inter Frame Video Coding", 15th IEEE International Conference on Image Processing, (ICIP 2008), Oct. 12-15, 2008, pp. 1120-1123.
Klomp et al., "Decoder-Side Block Motion Estimation for H.264/MPEG-4 AVC Based Video Coding", IEEE International Symposium on Circuits and Systems, (ISCAS 2009), May 24-27, 2009, pp. 1641-1644.
Kamp et al., "Fast Decoder Side Motion Vector Derivation for Inter Frame Video Coding", Picture Coding Symposium, (PCS 2009), May 6-8, 2009, pp. 1-4.
Combined Search and Examination Report for UK Patent Application No. 1015985.3, mailed on Jan. 17, 2011.
Combined Search and Examination Report received for UK Patent Application No. 1011216.7, mailed on Oct. 14, 2010.
Laroche et al., "RD opitmized coding for motion vector predictor selection", IEEE Transactions on circuits and systems for video technology, vol. 18, No. 12, Dec. 2008, pp. 1681-1691.
Chang A. et al: 11 Fast Integer Motion Estimation for H.264 Video Coding Standard 11, 2004 IEEE International Conference on Multimedia and Expo: Jun. 27-30, 2004, Taipei, Taiwan, IEEE Operations Center, Piscataway, NJ, vol. 1, Jun. 27, 2004, 4 pages.
Final Office Action for U.S. Appl. No. 12/566,823 mailed Apr. 14, 2014, 13 pages.
Final Office Action for U.S. Appl. No. 12/566,823 mailed Aug. 6, 2012, 18 pages.
Sullivan et al: "Meeting Report of the Second Meeting of the Joint Collaborative Team on Video Coding (JCT-VC)", Geneva, CH, Jul. 21-28, 2012, 72 pages.
Non-Final Office Action for U.S. Appl. No. 12/566,823 mailed Jan. 10, 2012, 10 pages.
Non-Final Office Action for U.S. Appl. No. 12/566,823 mailed Sep. 18, 2013, 12 pages.
Notice of Allowance for U.S. Appl. No. 12/566,823 mailed Aug. 14, 2014, 8 pages.
Office Action and Search Report for Taiwan Patent Application No. 099121807 mailed Feb. 15, 2015, 8 pages.
Office Action for German Patent Application No. 10 2010 025 816.4 mailed Jan. 30, 2015, 11 pages.
Ugur, et al: "11 Description of Video Coding Technology Proposal by Tandberg, Nokia, Ericsson", 1. JCT-VC Meeting; Apr. 15-23, 2010, DRESDEN, 33 pages.
Chiu, et al: "Fast techniques to improve self-derivation of motion estimation—presentation slides", Jul. 28, 2010, XP055255145, 15 pages.
"Content description data", Telecommunication Standardization Sector of ITU, Erratum 1, Recommendation ITU-T H.262 Amendment 1, Geneva, Apr. 22, 2002, 1 page.
"Infrastructure of audiovisual services—Coding of moving video", International Telecommunication Union, Series H: Audiovisual and Multimedia Systems, H.262, Feb. 2000, 220 pages.
"Series H: Audiovisual and Multimedia Systems Infrastructure of audiovisual services—Coding of moving video", International Telecommunication Union, H.262, Amendment 2, Jan. 2007, Information technology—Generic coding of moving pictures and associated audio information: Video Amendment 2: Support for colour spaces, 14 pages.
"Series H: Audiovisual and Multimedia Systems Infrastructure of audiovisual services—Coding of moving video", International Telecommunication Union, H.262, Corrigendum 2, Information technology—Generic coding of moving pictures and associated audio information: Video Technical Corrigendum 2, May 2006, 14 pages.
"Series H: Audiovisual and Multimedia Systems Infrastructure of audiovisiual services—Coding of moving video", International Telecommunication Union, H.262, Amendment 1, Nov. 2000, 26 pages.
"Series H: Audiovisual and Multimedia Systems Infrastructure of audiovisual services—Coding of moving video", International Telecommunication Union, H.262, Corrigendum 1, Nov. 2000, 10 pages.
"Series H: Audiovisual and Multimedia Systems Infrastructure of audiovisual services—Coding of moving video", International Telecommunication Union, H.264, Nov. 2007, Advanced video coding for generic audiovisual services, 564 pages.
Chiu, et al., "Fast Techniques to Improve Self Derivation of Motion Estimation", Joint Collaborative Team on Video Coding (JCT-VC) of ITU-T SG16 WP3 and ISO/IEC JTC1/SC29/WG11, JCTVC-B047, Jul. 21-28, 2010, 10 pages.
Chiu, et al., "Report of Self Derivation of Motion Estimation Improvement in TMuC", Joint Collaborative Team on Video Coding (JCT-VC) of ITU-T SG16 WP3 and ISO/IEC JTC1/SC29/WG11, Oct. 3, 2010, 13 pages.
Chiu, et al., "Self-Derivation of Motion Estimation Techniques to Improve Video Coding Efficiency", Applications of Digital Image Processing XXXIII Proc. of SPIE, vol. 7798, Sep. 7, 2010, 11 pages.
Search Report mailed Jul. 26, 2016 for TW Patent Application No. 104130109.

METHODS AND SYSTEMS TO ESTIMATE MOTION BASED ON RECONSTRUCTED REFERENCE FRAMES AT A VIDEO DECODER

CROSS REFERENCE TO RELATED APPLICATIONS

This application is a continuation of U.S. Utility patent application Ser. No. 12/566,823, filed Sep. 25, 2009, which claims the benefit of U.S. Application for Provisional Patent No. 61/222,982, filed on Jul. 3, 2009.

BACKGROUND

Motion estimation (ME) in video coding may be used to improve video compression performance by removing or reducing temporal redundancy among video frames. For encoding an input block, traditional motion estimation may be performed at an encoder within a specified search window in reference frames. This may allow determination of a motion vector to minimize the sum of absolute differences (SAD) between the input block and a reference block. The motion vector (MV) information can then be transmitted to a decoder for motion compensation. The motion vector can be determined for fractional pixel units, and interpolation filters can be used to calculate fractional pixel values.

Figure 1:
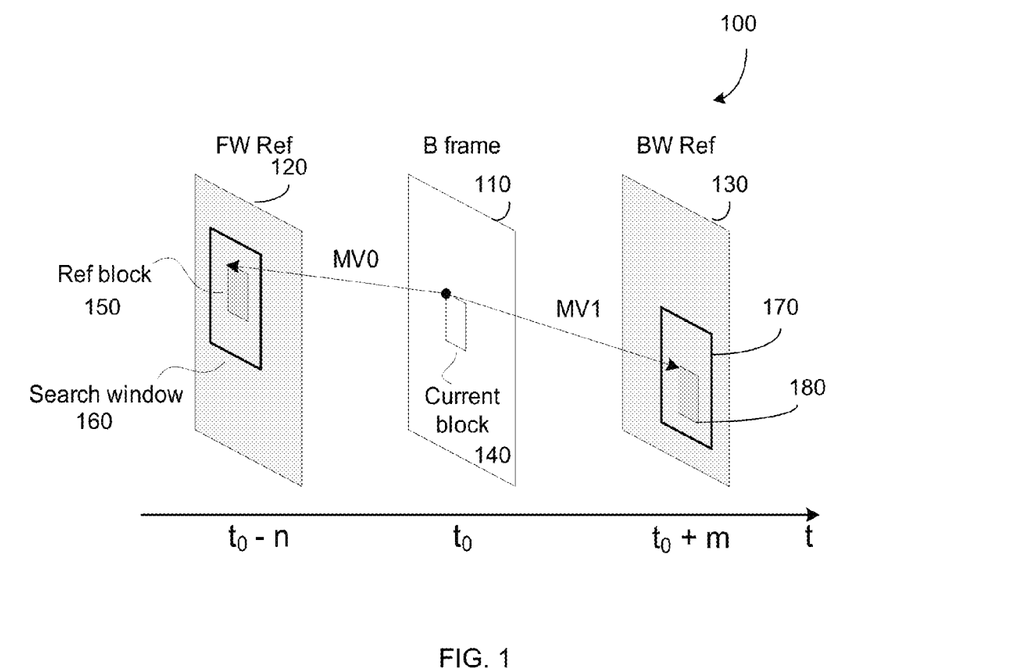
FIG. 1 illustrates motion estimation for a bi-directional video frame.

The motion estimation can be forward, backward or bi-directional, where backward and bi-directional ME may be used in the coding of bi-predictive frames (referred to herein as B frames) while forward ME can be used for both B frames and predicted frames (referred to herein as P-frames). FIG. 1 shows an example of ME for a B frame 110, where MV0 is a forward motion vector obtained by a forward motion search within a search window 160 in a forward reference frame 120. MV1 may be a backward motion vector obtained by a backward motion search within a search window 170 in a backward reference frame 130. In forward ME, the reference block 150 pointed to by MV0 is used as the prediction associated with a current block 140. In backward ME, the reference block 180 pointed to by MV1 may be used as the prediction, in the backwards direction, of the current block 140. In bi-directional ME, the average of the two reference blocks pointed to by MV0 and MV1 may be used as the prediction of the current block 140. Considering that a current block such as block 140 has motion similar to its temporal and spatial neighboring blocks, MV prediction can be performed using the MVs of neighboring blocks to get a predicted MV for a current block. The predicted MV can be used as the search center, and in an entropy coding process, only the difference between the searched MV and the predicted MV is encoded to reduce MV redundancy.

DETAILED DESCRIPTION

A digital video clip includes consecutive video frames. The motions of an object or background in consecutive frames may form a smooth trajectory, and motions in consecutive frames may have relatively strong temporal correlations. By utilizing this correlation, a motion vector can be derived for a current encoding block by estimating motion from reconstructed reference pictures. Determination of a motion vector at a decoder may reduce transmission bandwidth relative to motion estimation performed at an encoder.

Where original input frames are not available at the decoder, ME at the decoder can be performed using the reconstructed reference frames. When encoding a P frame, there may be multiple reference frames in a forward reference buffer. When encoding a B frame, there may be multiple reference frames in the forward reference buffer and at least one reference frame in a backward reference buffer.

The following discusses performing ME at a decoder, to obtain an MV for a current block, according to an embodiment. For B frame encoding, mirror ME or projective ME may be performed to get the MV. For P frame encoding, projective ME may be performed to get the MV.

Mirror ME at the Decoder

Figure 2:
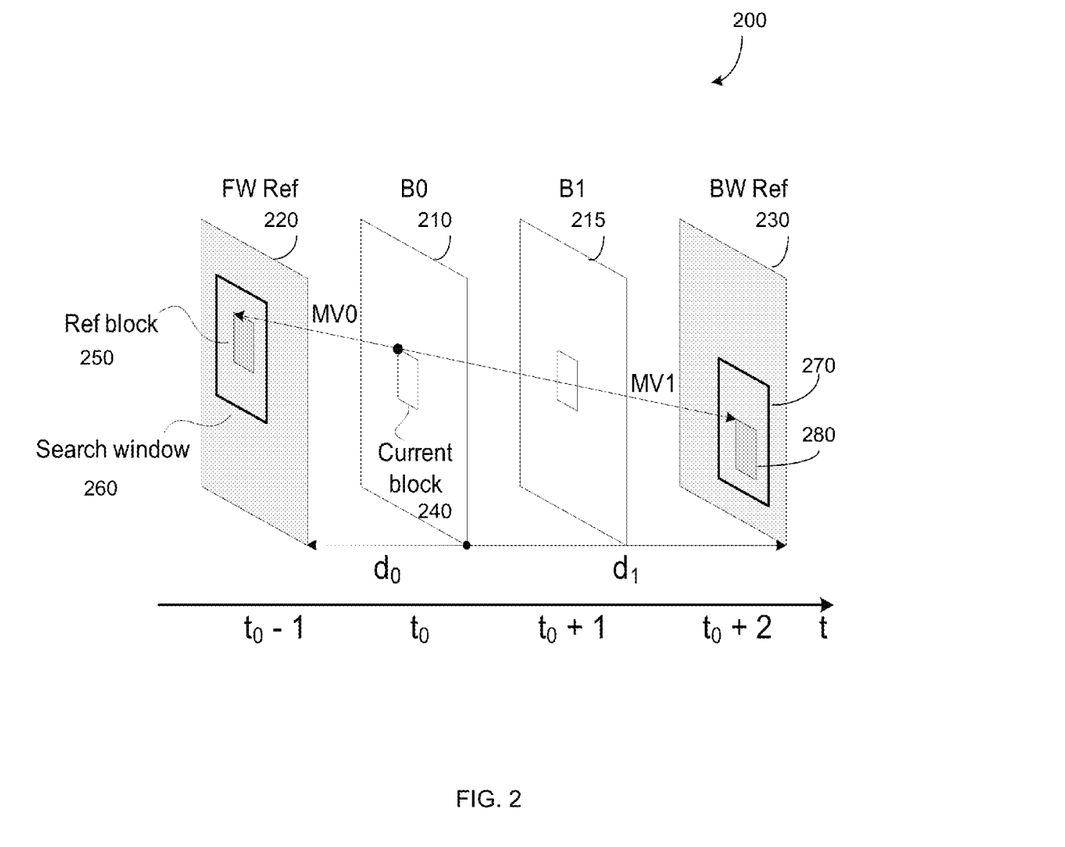
FIG. 2 illustrates mirror motion estimation at a decoder, according to an embodiment.

Mirror ME may use both forward and backward reference frames and, as a result, is generally applicable to B frame encoding. FIG. 2 shows how mirror ME may be performed according to an embodiment 200. In the embodiment of FIG. 2, there may be two B frames, 210 and 215, between a forward reference frame 220 and a backward reference frame 230. Frame 210 may be the current encoding frame. When encoding the current block 240, mirror ME can be performed to get motion vectors by performing searches in search windows 260 and 270 of reference frames 220 and 230, respectively. As mentioned above, where the current input block may not be available at the decoder, mirror ME may be performed with the two reference frames.

Figure 3:
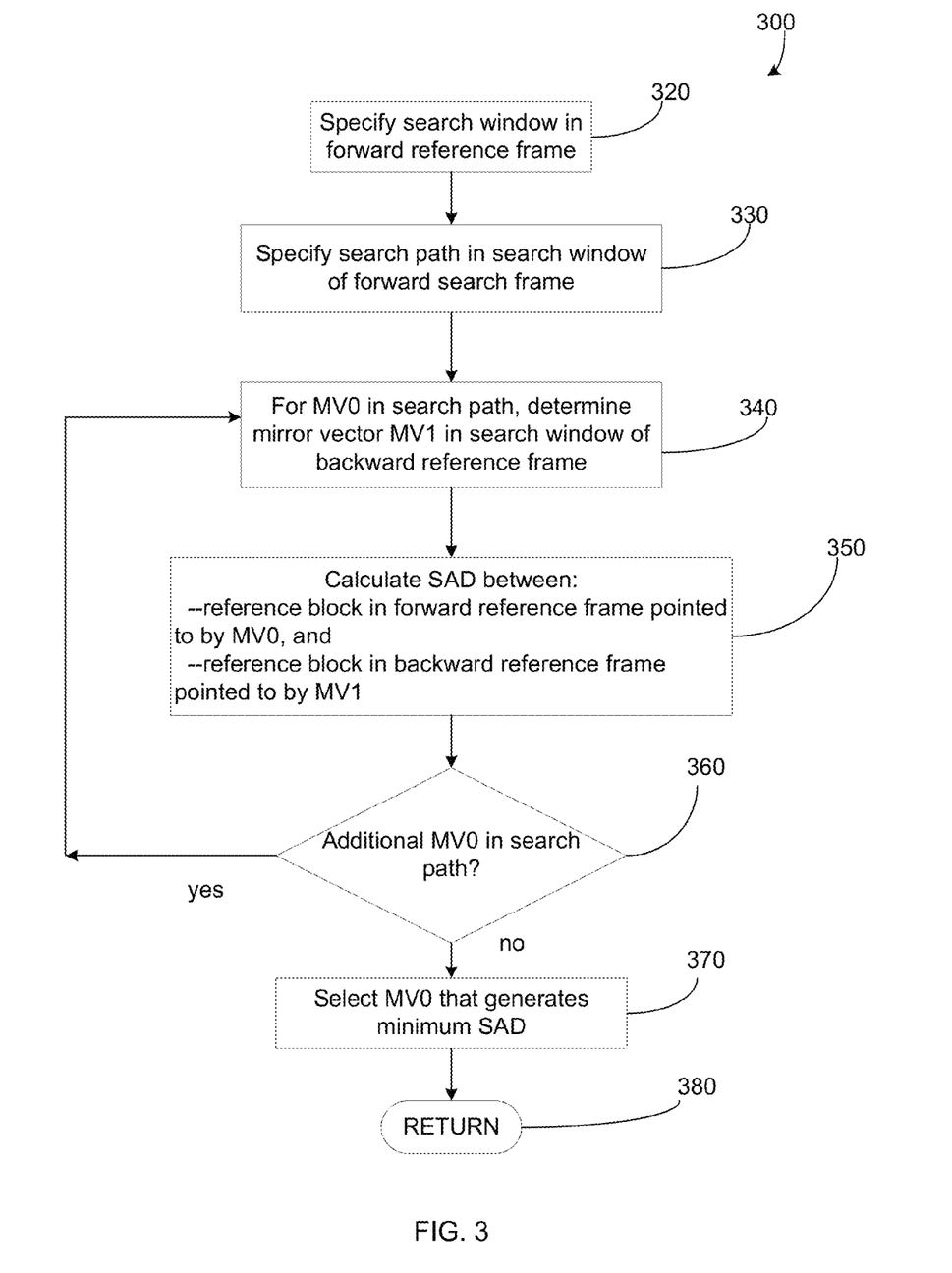
FIG. 3 is a flowchart illustrating the process of mirror motion estimation, according to an embodiment.

An exemplary motion search may proceed as illustrated in process 300 of FIG. 3. At 320, a search window may be specified in the forward reference frame. This search window may be the same at both the encoder and decoder. At 330, a search path may be specified in the forward search window. Full search or any fast search schemes can be used here, so long as the encoder and decoder follow the same search path. At 340, for an MV0 in the search path, its mirror motion vector MV1 may be obtained in the backward search window. Here it may be assumed that the motion trajectory is a straight line during the associated time period, which may be relatively short. MV1 can be obtained as the following function of MV0, where d0 and d1 may be the distances between the current frame and each of the respective reference frames.

$$MV1 = \frac{d_1}{d_0} MV0$$

At 350, a metric such as a sum of absolute differences (SAD) may be calculated between (i) the reference block pointed to by MV0 in the forward reference frame and (ii) the reference block pointed to by MV1 in the backward reference frame. These reference blocks may be shown as 250 and 280, respectively, in FIG. 2. At 360, a determination may be made as to whether any additional motion vectors MV0 exist in the search path. If so, the process may return to 340. As a result of this iteration, more than one MV0 may be obtained, where each MV0 has an associated MV1. Moreover, for each such associated pair, a metric, e.g., a SAD, may be obtained. At 370, the MV0 that generates the optimal value for the metric, e.g., the minimal SAD, is chosen. A lower value for the SAD metric, i.e., a value closer to zero, may suggest a preferred mode, because a SAD metric of zero represents a theoretical optimal value. The process concludes at 380.

Given the pair of motion vectors MV0 and MV1 that is obtained, for current block, its forward predictions P0(MV0) can be obtained with MV0, its backward predictions P1(MV1) can be obtained with MV1, and its bi-directional predictions can be obtained with both MV0 and MV1. The bi-directional predictions can be, for example, the average of P0(MV0) and P1(MV1), or the weighted average (P0(MV0) *d1+P1(MV1)*d0)/(d0+d1).

Figure 4:
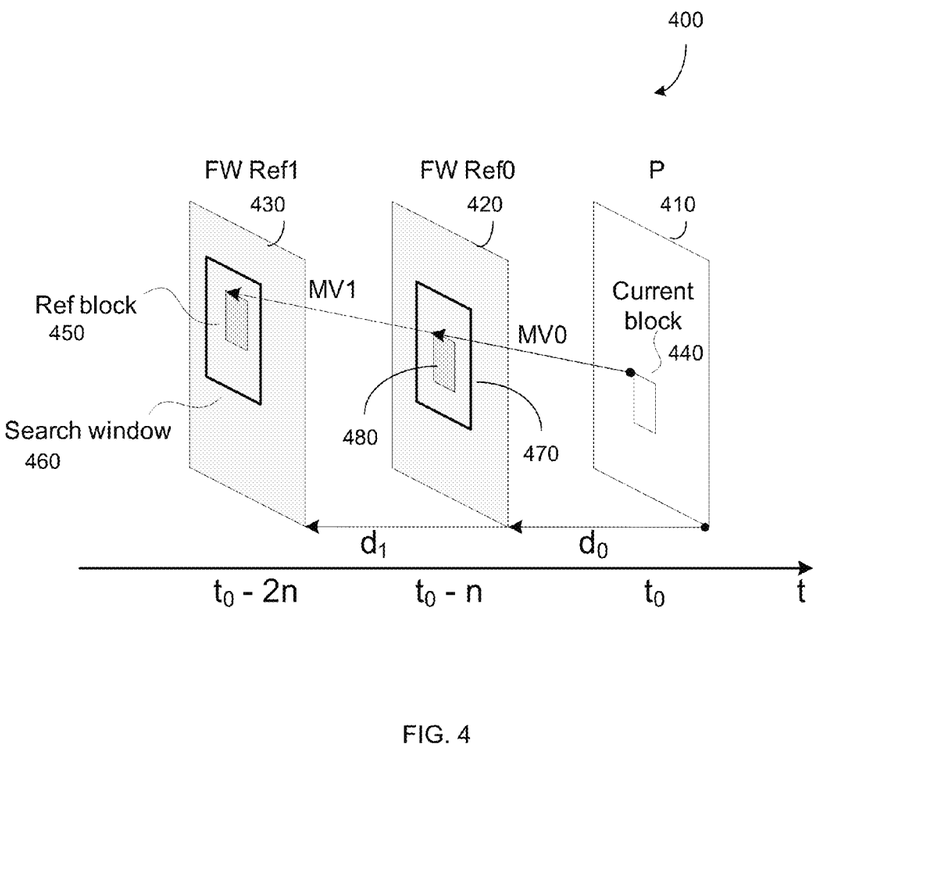
FIG. 4 illustrates projective motion estimation at a decoder, according to an embodiment.

An alternative function may be used to obtain a bi-directional prediction. In an embodiment, the encoder and decoder may use the same prediction method. In an embodiment, the chosen prediction method may be identified in a standards specification or signaled in the encoded bitstream.
Projective Motion Estimation at Decoder Projective ME may be performed to derive an MV for encoding the current block. FIG. 4 shows an exemplary projective ME process 400 that may use two forward reference frames, forward Ref0 (shown as reference frame 420) and forward Ref1 (shown as reference frame 430). These reference frames may be used to derive a motion vector for a target block 440 in a current frame 410. A search window 470 may be specified in reference frame 420, and a search path may be specified in search window 470. For each motion vector MV0 in the search path, its projective motion vector MV1 may be determined in search window 460 of reference frame 430. For each pair of motion vectors, MV0 and its associated motion vector MV1, a metric, such as a sum of absolute differences, may be calculated between (1) the reference block 480 pointed to by the MV0 in reference frame 420, and (2) the reference block 450 pointed to by the MV1 in reference frame 430. The motion vector MV0 that yields the optimal value for the metric, e.g., the minimal SAD, may then be chosen as the motion vector for target block 440.

Figure 5:
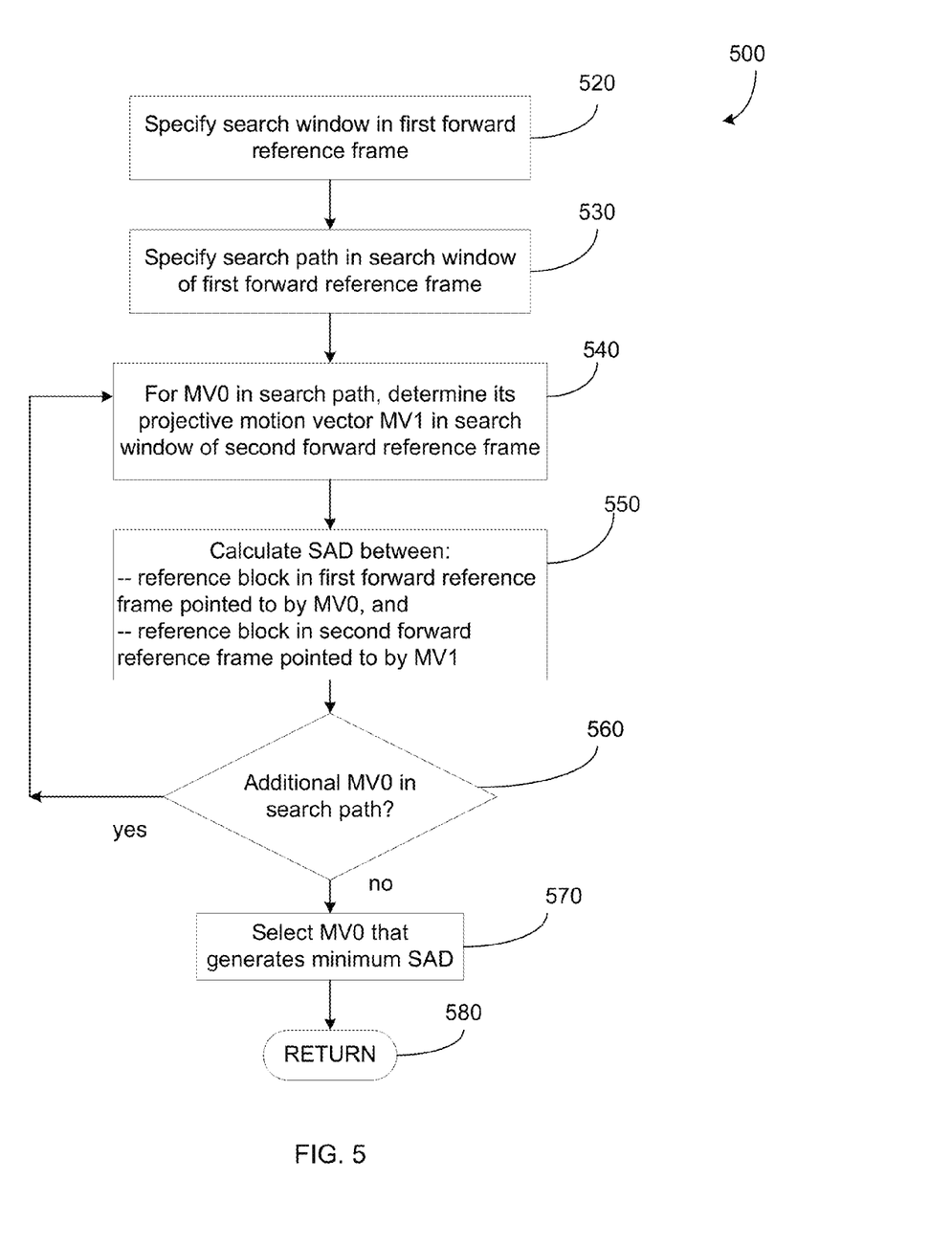
FIG. 5 is a flowchart illustrating the process of projective motion estimation at a decoder, according to an embodiment.

This process is illustrated as flow chart 500 in FIG. 5. At 520, a search window may be specified in a first forward reference frame. This window may be the same at both the encoder and decoder. At 530, a search path may be specified in this search window. Full search or fast search schemes may be used here, for example, so that the encoder and decoder may follow the same search path. At 540, for a motion vector MV0 in the search path, its projective motion vector MV1 may be obtained in the second search window. Here it may be assumed that the motion trajectory is a straight line over this short time period. MV1 may be obtained as the following function of MV0, where d0 and d1 may be the distances between the current frame and each of the respective reference frames.

$$MV1 = \frac{d_1}{d_0} MV0$$

At 550, a metric such as a SAD may be calculated between (i) the reference block pointed to by MV0 in the first reference frame, and (ii) the reference block pointed to by MV1 in the second reference frame. At 560, a determination may be made as to whether there are any additional motion vectors MV0 that remain in the search path and that have not yet been considered. If at least one MV0 remains, the process may return to 540, where for another MV0, its corresponding projective motion vector MV1 may be determined. In this manner, a set of pairs, MV0 and MV1, may be determined and a metric, e.g., a SAD, calculated for each pair. At 570, one of the MV0s may be chosen, where the chosen MV0 yields the optimal value for the metric, e.g., the minimal SAD. A lower value for the SAD metric, i.e., a value closer to zero, may suggest a preferred mode, because an SAD metric of zero represents a theoretical optimal value. This MV0 may then be used to predict motion for the current block. Process 500 concludes at 580.

The predictions for the current block may be obtained in different ways. The predictions can be P0(MV0)), P1(MV1), (P0(MV0)+P1(MV1))/2, or (P0(MV0)*d1+P1(MV1)*d0)/ (d0+d1), for example. In other embodiments, other functions may be used. The predictions may be obtained in the same way at both the encoder and decoder. In an embodiment, the prediction method may be identified in a standards specification or signaled in the encoded bitstream.
Partitions Based on Multiple Block Motion Estimation In the above discussion of ME as performed by a decoder for a current block, the motion search block may have the same dimensions as the current block. For example, if the current block is a 16×8 block, a 16×8 block motion search may be performed to derive the MVs. The motion search may be performed on blocks that are divided differently, however. This is illustrated as embodiment 600 of FIG. 6.

Figure 6:
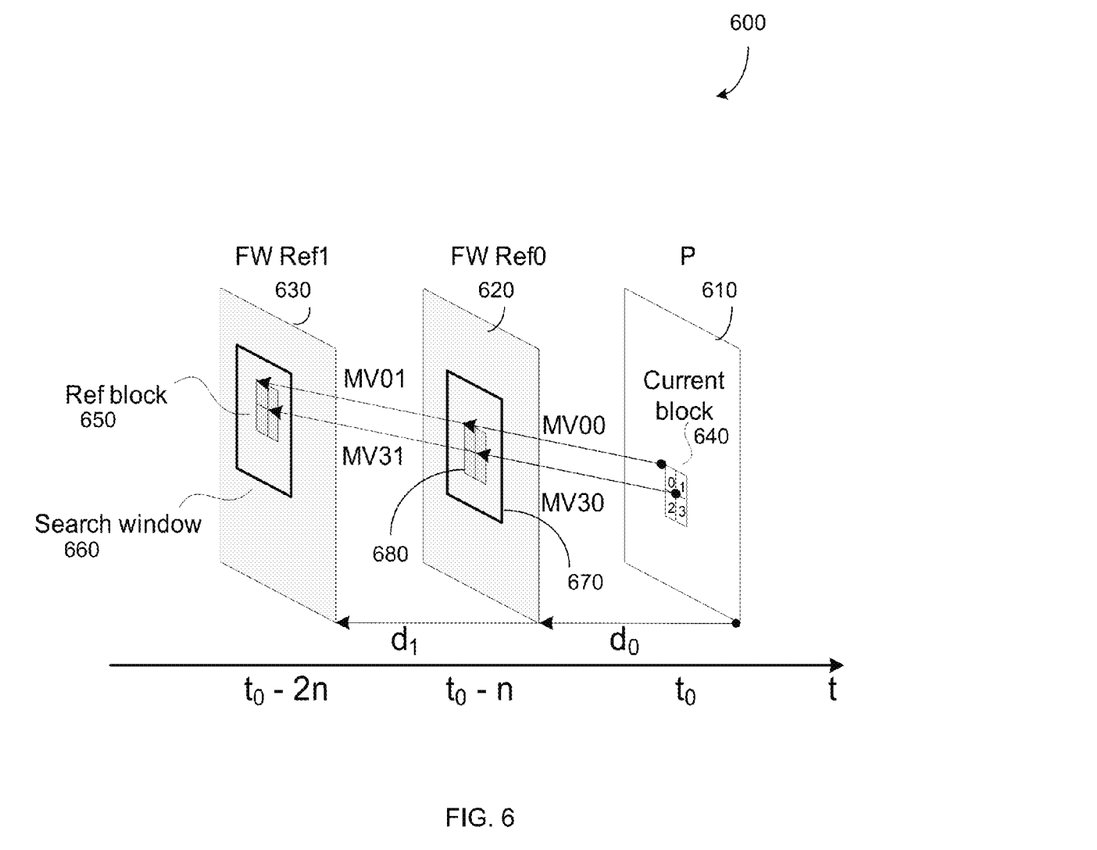
FIG. 6 illustrates projective motion estimation based on multiple block partitions, according to an embodiment.

Assuming that in the current frame 610 the current block 640 is a 16×16 block, block 640 may be partitioned into four sub-blocks that are each 8×8, labeled as 0 . . . 3 in the figure. Then the projective ME for each 8×8 sub-block may be performed to get an MV, i.e., MVi0, for each 8×8 sub-block i to obtain an 8×8 prediction for the sub-block.

This projective ME process may be analogous to the process described above with respect to FIGS. 4 and 5, but may be performed for each sub-block of a current block. Specifically, for a given sub-block, a search window 670 may be specified in a first reference frame 620, where window 670 includes a reference block 680, and a search path may be specified in this search window. For each MVi0 in the search path, its projective motion vector MVi1 may be determined in a search window 660 (which includes a reference block 650) of second reference frame 630. A metric such as a SAD may be calculated for each pair of MVi0 and MVi1, in order to find the pair having the optimal metric, e.g., the minimal SAD. This process may then be performed for each of the other sub-blocks of current block 640. In FIG. 6, two such motion vectors MVi0 are shown, labeled as MV00 and MV30. Though four MVs may be obtained in the illustrated example, it may not be necessary to transmit them to the decoder side since the decoder may derive them itself. Therefore, this block partitions-based ME process may reduce the prediction error since each 8×8 block is predicted independently. A block partitions-based mirror ME process can be performed in an analogous way.

For an input block, multiple block partitions may be available for ME. If the minimum block partition is defined as 4×4, for example, available block partitions are shown in following table. The encoder and decoder may use the same partitioning. The partitioning may be specified in a standards specification or be signaled in the encoded bitstream in an embodiment.

| Current block | Available partitions |
| --- | --- |
| 16 × 16 | 16 × 16, 16 × 8, 8 × 16, 8 × 8, 8 × 4, 4 × 8, 4 × 4 |
| 16 × 8 | 16 × 8, 8 × 8, 8 × 4, 4 × 8, 4 × 4 |
| 8 × 16 | 8 × 16, 8 × 8, 8 × 4, 4 × 8, 4 × 4 |
| 8 × 8 | 8 × 8, 8 × 4, 4 × 8, 4 × 4 |
| 8 × 4 | 8 × 4, 4 × 4 |
| 4 × 8 | 4 × 8, 4 × 4 |
| 4 × 4 | 4 × 4 |

Coding Modes and Mode Choice at Decoder

Figure 7:
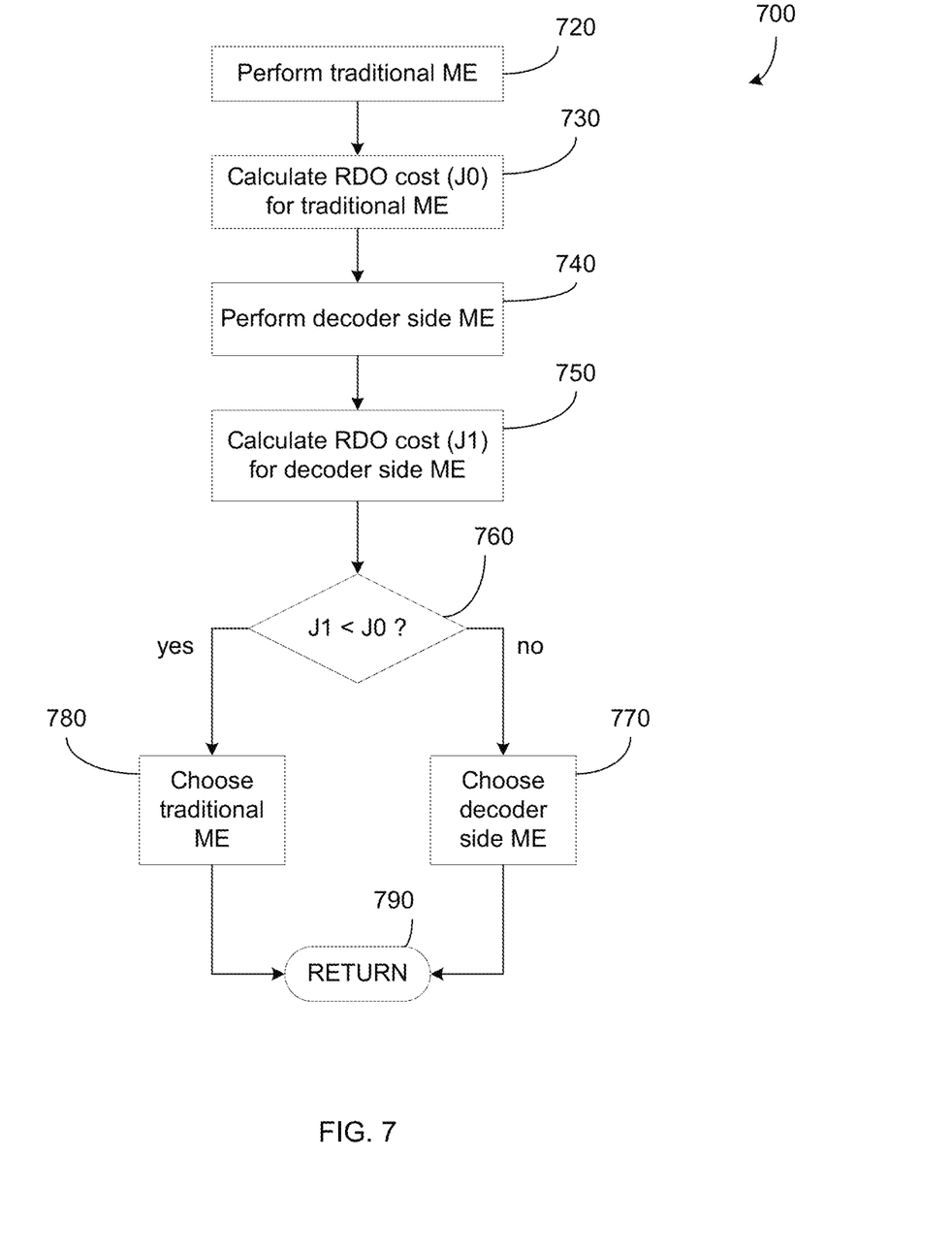
FIG. 7 is a flowchart illustrating the process of motion estimation mode choice, according to an embodiment.

In an embodiment, the traditional encoder side ME may not be replaced with the above decoder side ME. In this embodiment, any of the decoder side ME processes described above may be treated as an additional MB coding mode. Here the mode can be chosen based on a statistic such as a rate-distortion-optimization (RDO) criterion. This is illustrated in as process 700 of FIG. 7. At 720, the traditional encoder side ME may first be performed for a current block to get an MV using this coding mode. At 730, the corresponding RDO cost statistic may be calculated. Let this cost be called J0. At 740, ME may be performed at the decoder as described in any of the above embodiments, to get an MV for this coding mode. At 750, the corresponding RDO cost statistic may be calculated to be J1. At 760, the two RDO cost statistics may be compared. If J1<J0, then at 770, the decoder side ME based result may be chosen. Otherwise, the result from the traditional ME based coding mode may be chosen at 780. The process concludes at 790. In an alternative embodiment, more than two modes may be similarly evaluated, where the mode having the lowest RDO cost statistic may be chosen. A flag can be used to signal the chosen mode in the communications between the encoder and decoder. Moreover, in alternative embodiments, one or more statistical criteria other than or in addition to the RDO criterion may be used.

Implementation

The encoder and decoder described above, and the processing performed by them as described above, may be implemented in hardware, firmware, or software, or a combination thereof. In addition, any one or more features disclosed herein may be implemented in hardware, software, firmware, or combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, may refer to a computer program product including a computer readable medium having computer program logic stored therein to cause a computer system to perform one or more features and/or combinations of features disclosed herein.

A software or firmware embodiment of the processing described above is illustrated in FIG. 8. System 800 may include a processor 820 and a body of memory 810 that may include one or more computer readable media that may store computer program logic 840. Memory 810 may be implemented as a hard disk and drive, a removable media such as a compact disk and drive, or a read-only memory (ROM) device, for example. Processor 820 and memory 810 may be in communication using any of several technologies known to one of ordinary skill in the art, such as a bus. Logic contained in memory 810 may be read and executed by processor 820. One or more I/O ports and/or I/O devices, shown collectively as I/O 830, may also be connected to processor 820 and memory 810.

Computer program logic 840 may include motion estimation logic 845. When executed, motion estimation logic 845 may perform the motion estimation processing described above. Logic 845 may include, for example, projective motion estimation logic 850 that, when executed, may perform operations described above with respect to FIGS. 4-6. Logic 845 may also include, for example, mirror motion estimation logic 860. When logic 860 is executed on processor 820, the functionality described above with respect to FIGS. 2 and 3 may be performed.

Figure 8:
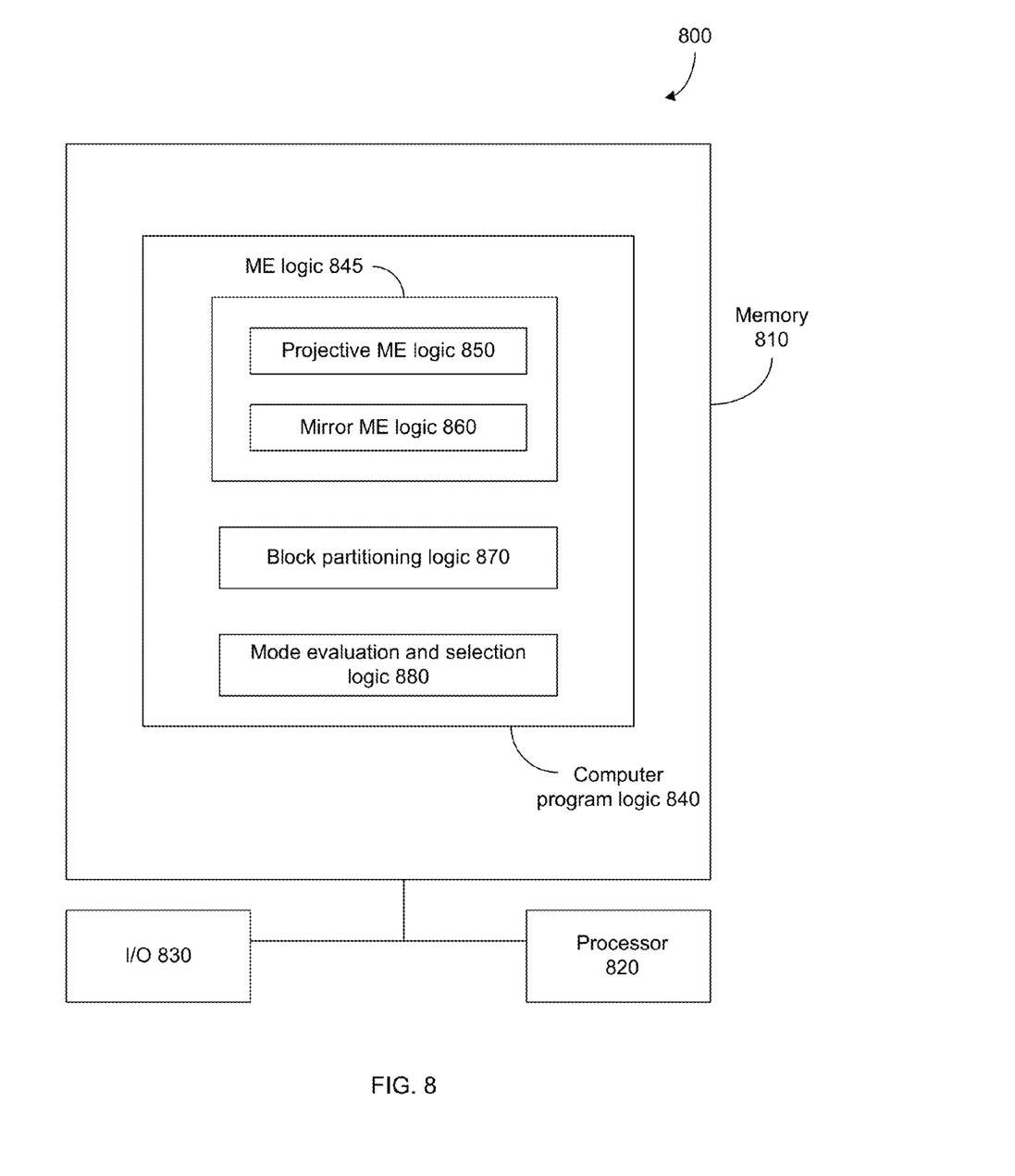
FIG. 8 is a block diagram illustrating a computing context of the systems and methods described herein, according to an embodiment.

Computer program logic 840 may also include block partitioning logic 870, which, when executed, may partition a current block into sub-blocks as shown in FIG. 6. After the partitioning, motion estimation may be performed on each sub-block by projective motion estimation logic 850, for example. Computer program logic 840 may also include mode evaluation and selection logic 880. When executed by processor 820, logic 840 may perform the processing shown as 730 and 750-780 in FIG. 7.

Alternatively, any of the logic modules shown in computer program logic 840 may be implemented in hardware.

Methods and systems are disclosed herein with the aid of functional building blocks, such as those listed above, describing the functions, features, and relationships thereof. At least some of the boundaries of these functional building blocks have been arbitrarily defined herein for the convenience of the description. Alternate boundaries may be defined so long as the specified functions and relationships thereof are appropriately performed. In addition, the encoder and decoder described above may be incorporated in respective systems that encode a video signal and decode the resulting encoded signal respectively using the processes noted above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A machine-implemented method to estimate motion at a video decoder, comprising:

defining, at the decoder, a motion estimation search window for a first coding block of a first frame of a video;

selecting, at the decoder, a motion vector to a block of a second frame of the video and a motion vector to a block of a third frame of the video based on the search window, distances between the first frame and each of the second and third frames, and a measure of visual similarity between the respective blocks of the second and third frames;

deriving, at the decoder, a motion vector for the first block based on the selected motion vector to a block of the second frame and the selected motion vector to a block of the third frame;

storing the motion vector for the first block to a memory coupled with, or included in, the video decoder; and predicting the first block based on the stored motion vector and the block of the second or third frame.

2. The machine-implemented method of claim 1, wherein the selecting includes:

identifying motion vectors to blocks of the second frame based on the search window;

computing motion vectors to blocks of the third frame based on respective ones of the motion vectors to blocks of the second frame and the distances between the first frame and each of the second and third frames; and selecting one of the motion vectors to blocks of the second frame and a corresponding one of the motion vectors to blocks of third frame based on a measure of visual similarity between the respective blocks of the second and third frames.

3. The machine-implemented method of claim 1, wherein the deriving a motion vector for the first block includes:

deriving the motion vector for the first block based on a combination of the selected motion vector to a block of the second frame, the selected motion vector to a block of the third frame, and the distances between the first frame and each of the second and third frames.

4. The machine-implemented method of claim 1, wherein the second frame is a forward reference frame relative to the first frame and the third frame is a backward frame relative to the first frame, and wherein the selecting includes:

identifying motion vectors to blocks of the forward reference frame based on the search window;

computing mirror motion vectors to blocks of the backward reference frame based on respective ones of the motion vectors to blocks of the forward reference frame and the distances between the first frame and each of the forward and backward reference frames; and selecting one of the motion vectors to blocks of the forward reference frame and a corresponding one of the mirror motion vectors to blocks of the backward reference frame based on a measure of visual similarity between the respective blocks of the forward and backward reference frames.

5. The machine-implemented method of claim 3, wherein the deriving a motion vector for the first block includes:

predicting a bi-directional motion vector for the first block based on a combination of the selected motion vector to a block of the forward reference frame, the selected mirror motion vector to a block of the backward reference frame, and the distances between the first frame and each of the forward and backward reference frames.

6. The machine-implemented method of claim 1, wherein the second frame is a first forward reference frame relative to the first frame and the third frame is a second forward frame relative to the first frame, and wherein the selecting includes:

identifying motion vectors to blocks of the first forward reference frame based on the search window;

computing projective motion vectors to blocks of the second forward reference frame based on respective ones of the motion vectors to blocks of the first forward reference frame and the distances between the first frame and each of the first and second forward reference frames; and selecting one of the motion vectors to blocks of the first forward reference frame and a corresponding one of the projective motion vectors to blocks of the second forward reference frame based on a measure of visual similarity between the respective blocks of the first and second forward reference frames.

7. The machine-implemented method of claim 6, wherein the deriving a motion vector for the first block includes:

predicting a forward motion vector for the first block based on a combination of the selected motion vector to a block of the first forward reference frame, the selected projective motion vector to a block of the second forward reference frame, and the distances between the first frame and each of the first and second forward reference frames.

8. A video decoding apparatus, comprising:

a memory; and a processor coupled to the memory, the processor to:

define a motion estimation search window for a first coding block of a first frame of a video;

select a motion vector to a block of a second frame of the video and a motion vector to a block of a third frame of the video based on the search window, distances between the first frame and each of the second and third frames, and a measure of visual similarity between the respective blocks of the second and third frames;

derive a motion vector for the first block based on the selected motion vector to a block of the second frame and the selected motion vector to a block of the third frame; and predict the first block based on the stored motion vector and the block of the second or third frame.

9. The apparatus of claim 8, wherein the processor is further to:

identify motion vectors to blocks of the second frame based on the search window;

compute motion vectors to blocks of the third frame based on respective ones of the motion vectors to blocks of the second frame and the distances between the first frame and each of the second and third frames; and select one of the motion vectors to blocks of the second frame and a corresponding one of the motion vectors to blocks of third frame based on a measure of visual similarity between the respective blocks of the second and third frames.

10. The apparatus of claim 8, wherein the processor is further to:

derive the vector for the first block based on a combination of the selected motion vector to a block of the second frame, the selected motion vector to a block of the third frame, and the distances between the first frame and each of the second and third frames.

11. The apparatus of claim 8, wherein the second frame is a forward reference frame relative to the first frame and the third frame is a backward frame relative to the first frame, and wherein the processor is further to:

identify motion vectors to blocks of the forward reference frame based on the search window;

compute mirror motion vectors to blocks of the backward reference frame based on respective ones of the motion vectors to blocks of the forward reference frame and the distances between the first frame and each of the forward and backward reference frames; and select one of the motion vectors to blocks of the forward reference frame and a corresponding one of the mirror motion vectors to blocks of the backward reference frame based on a measure of visual similarity between the respective blocks of the forward and backward reference frames.

12. The apparatus of claim 11, processor is further to:
predict a bi-directional motion vector for the first block based on a combination of the selected motion vector to a block of the forward reference frame, the selected mirror motion vector to a block of the backward reference frame, and the distances between the first frame and each of the forward and backward reference frames.

13. The apparatus of claim 8, wherein the second frame is a first forward reference frame relative to the first frame and the third frame is a second forward frame relative to the first frame, and wherein the processor is further to:
identify motion vectors to blocks of the first forward reference frame based on the search window;
compute projective motion vectors to blocks of the second forward reference frame based on respective ones of the motion vectors to blocks of the first forward reference frame and the distances between the first frame and each of the first and second forward reference frames; and
select one of the motion vectors to blocks of the first forward reference frame and a corresponding one of the projective motion vectors to blocks of the second forward reference frame based on a measure of visual similarity between the respective blocks of the first and second forward reference frames.

14. The apparatus of claim 13, wherein the processor is further to:
predict a forward motion vector for the first block based on a combination of the selected motion vector to a block of the first forward reference frame, the selected projective motion vector to a block of the second forward reference frame, and the distances between the first frame and each of the first and second forward reference frames.

15. A non-transitory computer readable medium encoded with a computer program that includes instructions to cause a video decoding processor to:
define a motion estimation search window for a first coding block of a first frame of a video;
select a motion vector to a block of a second frame of the video and a motion vector to a block of a third frame of the video based on the search window, distances between the first frame and each of the second and third frames, and a measure of visual similarity between the respective blocks of the second and third frames;
derive a motion vector for the first block based on the selected motion vector to a block of the second frame and the selected motion vector to a block of the third frame
store the motion vector for the first block to a memory coupled to the processor; and
predict the first block based on the stored motion vector and the block of the second or third frame.

16. The non-transitory computer readable medium of claim 15, further including instructions to cause the processor to:
identify motion vectors to blocks of the second frame based on the search window;
compute motion vectors to blocks of the third frame based on respective ones of the motion vectors to blocks of the second frame and the distances between the first frame and each of the second and third frames; and
select one of the motion vectors to blocks of the second frame and a corresponding one of the motion vectors to blocks of third frame based on a measure of visual similarity between the respective blocks of the second and third frames.

17. The non-transitory computer readable medium of claim 15, further including instructions to cause the processor to:
derive the vector for the first block based on a combination of the selected motion vector to a block of the second frame, the selected motion vector to a block of the third frame, and the distances between the first frame and each of the second and third frames.

18. The non-transitory computer readable medium of claim 15, wherein the second frame is a forward reference frame relative to the first frame and the third frame is a backward frame relative to the first frame, further including instructions to cause the processor to:
identify motion vectors to blocks of the forward reference frame based on the search window;
compute mirror motion vectors to blocks of the backward reference frame based on respective ones of the motion vectors to blocks of the forward reference frame and the distances between the first frame and each of the forward and backward reference frames; and
select one of the motion vectors to blocks of the forward reference frame and a corresponding one of the mirror motion vectors to blocks of the backward reference frame based on a measure of visual similarity between the respective blocks of the forward and backward reference frames.

19. The non-transitory computer readable medium of claim 18, further including instructions to cause the processor to:
predict a bi-directional motion vector for the first block based on a combination of the selected motion vector to a block of the forward reference frame, the selected mirror motion vector to a block of the backward reference frame, and the distances between the first frame and each of the forward and backward reference frames.

20. The non-transitory computer readable medium of claim 15, wherein the second frame is a first forward reference frame relative to the first frame and the third frame is a second forward frame relative to the first frame, further including instructions to cause the processor to:
identify motion vectors to blocks of the first forward reference frame based on the search window;
compute projective motion vectors to blocks of the second forward reference frame based on respective ones of the motion vectors to blocks of the first forward reference frame and the distances between the first frame and each of the first and second forward reference frames; and
select one of the motion vectors to blocks of the first forward reference frame and a corresponding one of the projective motion vectors to blocks of the second forward reference frame based on a measure of visual similarity between the respective blocks of the first and second forward reference frames.

* * * * *